United States Patent [19]

Akamatsu

[11] 4,251,757

[45] * Feb. 17, 1981

[54] POWER CONTROL SYSTEM AND APPARATUS THEREOF

[75] Inventor: Masahiko Akamatsu, Amagasaki, Japan

[73] Assignee: Mitsubishi Denki Kabushiki Kaisha, Tokyo, Japan

[*] Notice: The portion of the term of this patent subsequent to Mar. 27, 1996, has been disclaimed.

[21] Appl. No.: 35,109

[22] Filed: May 1, 1979

Related U.S. Application Data

[63] Continuation of Ser. No. 774,546, Mar. 4, 1977, abandoned.

[30] Foreign Application Priority Data

Jun. 18, 1975 [JP] Japan .................................. 50-74686
Mar. 3, 1976 [JP] Japan .................................. 51-22827

[51] Int. Cl.³ ...................... H02M 7/515; H02P 5/16
[52] U.S. Cl. ........................................ 318/83; 318/51; 318/56; 318/111; 318/112; 363/138; 363/96; 318/139; 318/294
[58] Field of Search ................ 318/51, 56, 82, 83, 318/87, 109, 112, 139, 293, 294; 363/124, 137, 138

[56] References Cited

U.S. PATENT DOCUMENTS

| | | | |
|---|---|---|---|
| 3,555,397 | 1/1971 | Frank | 363/138 |
| 3,781,645 | 12/1973 | Grom et al. | 363/138 |
| 4,079,443 | 3/1978 | Vajardi-Lakos et al. | 363/138 |
| 4,146,921 | 3/1979 | Akamatsu | 363/138 |

FOREIGN PATENT DOCUMENTS

570167  8/1977  U.S.S.R. .................................. 363/138

Primary Examiner—J. V. Truhe
Assistant Examiner—John W. Redman
Attorney, Agent, or Firm—Oblon, Fisher, Spivak, McClelland & Maier

[57] ABSTRACT

Power control system comprising an intermittent device for applying intermittent voltage between intermittent voltage terminals; the intermittent device having a DC input terminal and at least one pair of intermittent terminals; a plurality of pairs of reverse series connected devices comprising control electrical valves and other electrical valves; said connected devices being connected in parallel between the intermittent voltage terminals; and a plurality of loads which are respectively connected to the series junctions of the plurality of pairs of reverse series connected devices.

39 Claims, 21 Drawing Figures

POWER CONTROL SYSTEM AND APPARATUS THEREOF

This is a continuation, of application Ser. No. 774,546, filed Mar. 4, 1977, now abandoned.

BACKGROUND OF THE INVENTION

1. Field of the Invention

The present invention relates to a power control system and an apparatus thereof wherein a plurality of loads are independently driven.

2. Description of the Prior Arts

Usually, an inverter unit or a chopper control unit is connected for each load when a plurality of loads which can be independently driven by an inverter or a chopper are controlled.

In such system, a turn-off means is required for each electrical valve arm switched. Accordingly, it is not economical.

Usually, when a plurality of electrical valves are used in an inverter device or a chopper control device, it is not economical to provide a turn-off means for each electrical valve. Accordingly, it has been proposed to provide a common turn-off means for all electrical valves to turn them off them.

However, in the known common turn-off system, the electrical valve group is reverse-biased by the charge of a commutation capacitor whereby the line impedance of wiring etc. is affected to cause nonuniform turn-off of the electrical valves and the preciseness of the reverse-bias is disadvantageously decreased when the number of electrical valves for turn-off is increased.

SUMMARY OF THE INVENTION

It is an object of the present invention to provide a novel power control system which is suitable for controlling a plurality of load groups which can be independently driven.

It is another object of the present invention to provide a turn-off system of a power control apparatus comprising electrical valves.

Yet another object of the invention is to provide a power control system for providing precise reverse-bias of a plurality of electrical valves.

The foregoing and other objects are attained by providing a power control system which comprises intermittent means for applying intermittent voltage between intermittent voltage terminals; said intermittent means having a DC terminal and at least one pair of intermittent terminals; a plural pairs of reverse series connected means comprising control electrical valves and other electrical valves; said connected means being connected in parallel between said intermittent voltage terminals; and a plurality of loads which are respectively connected to the series contacts of said plural pairs of reverse series connected means and which are independently driven.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which;

FIGS. 1(a) (b) are respectively a connection diagram of one embodiment according to the present invention and operation time chart;

FIGS. 9(a), (b) are respectively connection diagrams of the other embodiments of invention; and FIGS. 10(a), (b) are a connection diagram of the other embodiment and the operation time chart thereof.

DETAILED DESCRIPTION OF THE PREFERRED EMBODIMENTS

Referring now to the drawings, wherein like reference numerals designate identical or corresponding parts throughout the several views, the embodiments of the present invention will be illustrated.

Figure 1:
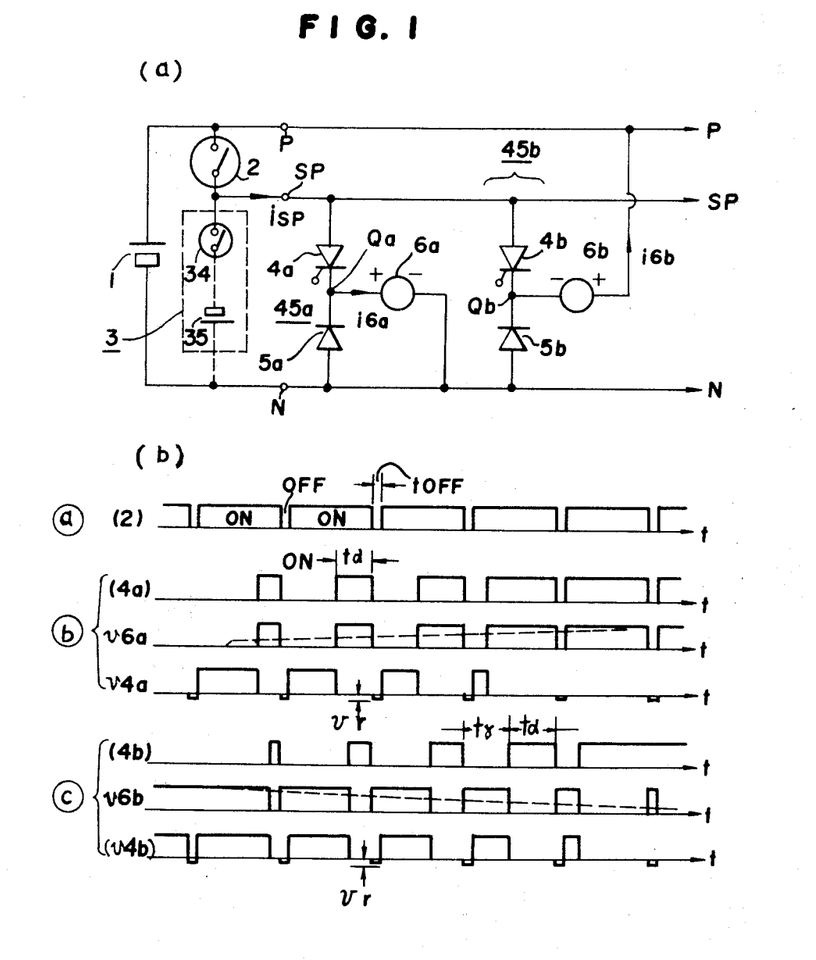

FIG. 1 is a connection diagram of one embodiment of the invention wherein the reference numeral (1) designates a DC power source and (2) designates intermittent means, which can be a transistor, a gate turn-off thyristor, a thyristor chopper and a solid switch formed by combination thereof. The intermittent means (2) gives intermittent potential to the intermittent potential point SP to turn-off the forward current to the intermittent potential point SP.

When the current turn-off characteristics of the intermittent means (2) is not enough to result in spontaneous turn-off of a control electrical valve (4) (the leakage current in OFF state exceeds the sustaining current of the control electrical valve) or the turn-off of the forward current to the intermittent potential point SP is promoted or the turn-off of the control electrical valve is promoted, a reverse potential intermittent auxiliary means (3) is connected. The intermittent auxiliary means (3) maintains the reverse potential at the intermittent potential point SP during the time ($t_{OFF}$) for the turn-off of the electrical valve (4).

The embodiment of FIG. 1, comprises an auxiliary solid switch (34) and an auxiliary power source (35).

Thus, the intermittent means (2) gives the forward potential to the intermittent potential point SP, and the forward current $i_{SP}$ is periodically turned-off during the predetermined time $t_{OFF}$. The operation is shown in FIG. 1(b) ⓐ. During the turn-off time, the intermittent auxiliary means (3) gives the reverse potential as the potential at SP, to allow a certain reverse current $\ominus i_{SP}$. As the result, the forward potential is given during main times and zero potential or a certain reverse potential is given periodically during short times $t_{OFF}$.

Plural pairs of the reverse series combinations of the control electrical valve (4) and the electrical valve (5) are respectively connected in parallel between the fixed potential point N and the intermittent potential point SP. A plurality of the loads (6a), (6b) such as motors which should be independently driven, are respectively connected between terminals of the series connected points $Q_a$, $Q_b$ and DC power source.

In FIG. 1, the connection in feed control is designated as (6a) and the connection in regenerative control is designated as (6b). The control electrical valve (4a)

controls during the turn-on gain time tα to the turn-off point by the intermittent means (2), as shown in FIG. 1(b) ⓑ, whereby the DC power voltage is applied to the load (6a) during the turn-on gain time tα, which is shown as $v_{6a}$. The voltage of the control electrical valve (4a) is shown as $v_{4a}$. The control electrical valve (4a) is turned off during the turn-off time $t_{OFF}$ of the intermittent means (2) whereby the feed voltage is controlled at the turn-on gain point tα during the forward potential section. When the intermittent auxiliary means (3) is connected, the reverse voltage $v_r$ is applied through the electrical valve (5a) to the control electrical valve (4a) during the turn-off time, whereby the turn-off is precisely caused at higher speed.

On the other hand, in the load (6b) under regeneration, the control electrical valve (4b) controls the turn-off delay time tγ after the turn-off (tγ=T−tα; T: intermittent period) as shown in FIG. 1 (b) ⓒ (4b) whereby the load (6b) is short-circuited through (4b)—(6b)—(2) during the turn-on time tα of the control electrical valve (4b) to increase the current $i_{6b}$ whereas the load (6b) is regenerated through (5b)-(6b)-(1) during the turn-on delay time t5 to decrease the current $i_{6b}$. As the result, the load terminal voltage $v_{6b}$ and the control electrical valve voltage $v_{4b}$ are respectively given as shown in FIG. 1(b) ⓒ.

As described above, the feed control or regenerative control of desired plural loads can be attained with the common intermittent means (2). The intermittent potential point SP and the fixed potential point N or P can be connected to the other electrical valve devices (45) and the loads (6), which can be independently controlled as the rectifier operated by the commercial AC power source. Thus, these electrical valve devices can be controlled only by the turn-on point control without any commutating means, to be conomical.

Accordingly, it is remarkably effective to the control of many loads which are in various operating conditions.

FIGS. 2(a) to (c) are respectively connection diagrams of other embodiments of the invention, wherein the AC loads or the reversible DC loads are controlled.

Figure 2:
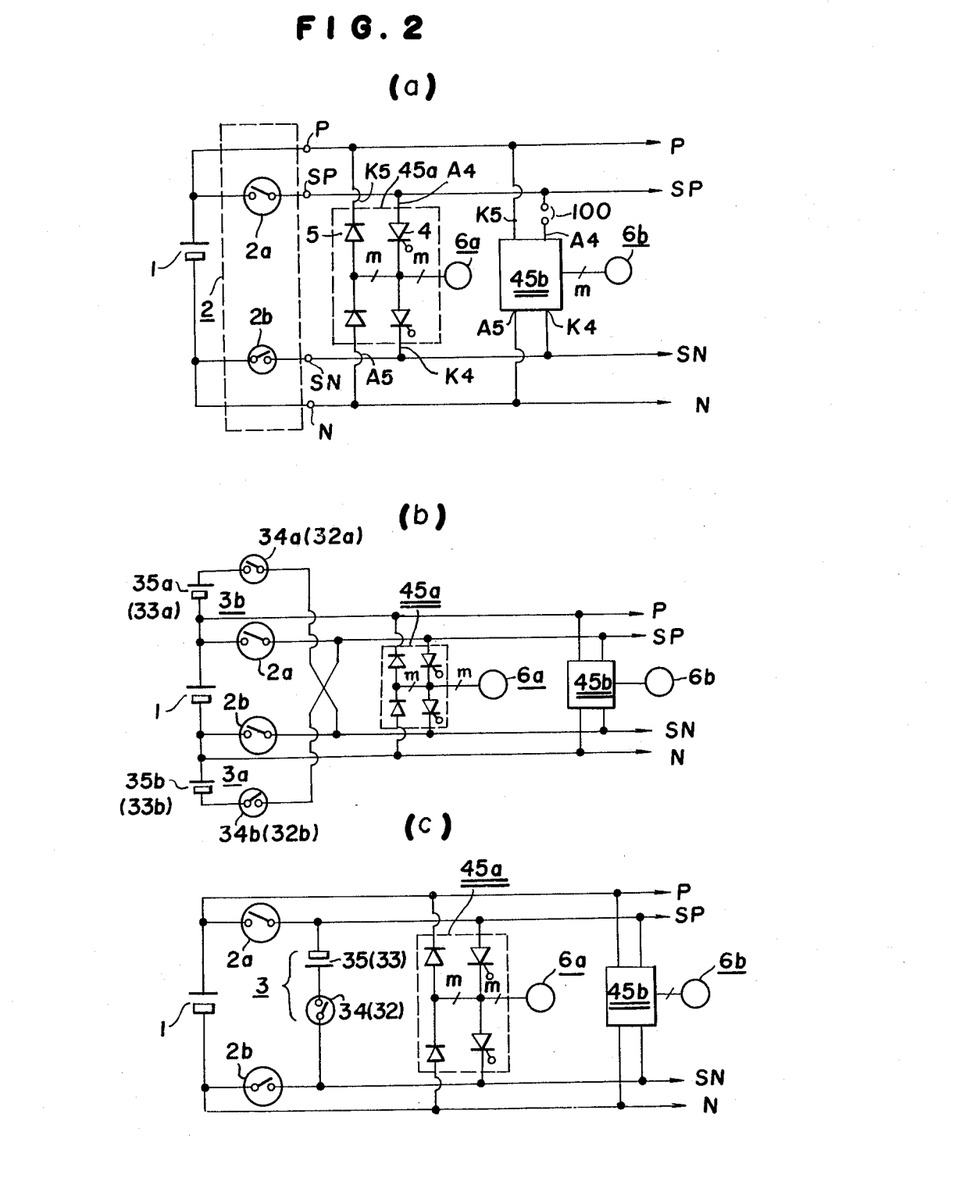
FIGS. 2(a) to (c) are respectively connection diagrams of other embodiments.
FIG. 2(d) is a connection diagram of electrical valves.

In FIGS. 2, the intermittent means (2a), (2b) are connected to the positive and negative polarity lines to give the intermittent potential points (SP), (SN) and the fixed potential points (P)(N).

Figure 2D:
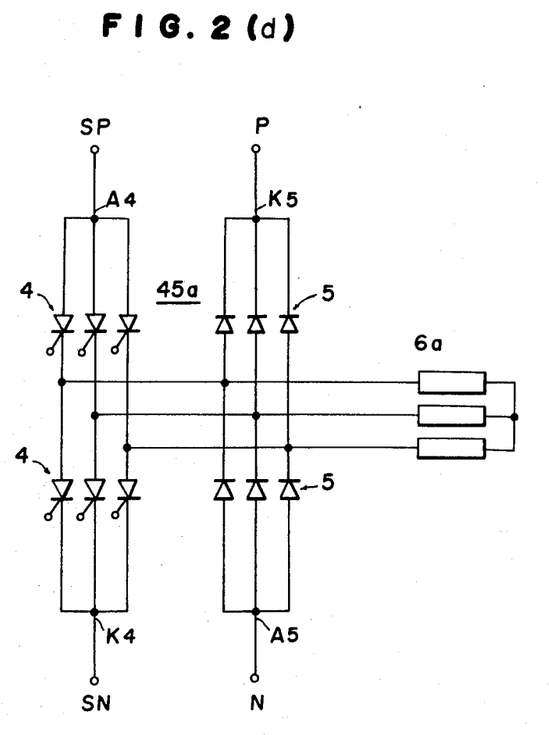

The control electrical valves (4) (for example, three phase circuit) form a bride connection which commonly connects the DC terminal A4, K4 at the intermittent potential point SP. The electrical valves (5) form a bridge connection which commonly connects the DC terminals K5, A5 at the fixed potential points (P, N). (see FIG. 2(d)) Three reversible polarity output terminals of the electrical valve bridges are connected to the load (6).

The intermittent auxiliary means (3) can be connected between SP and N and between SN and P as FIG. 2(b), or can be connected between SP and SN as FIG. 2(c).

The embodiment will be illustrated in detail.

Figure 3:
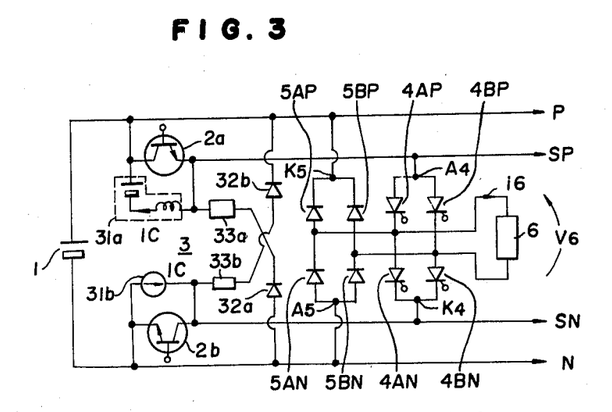
FIG. 3 is a connection diagram showing the operation controlling method of the invention.

FIG. 3 is a connection circuit of two terminal output circuit (single phase bridge connection) for illustrating basic operations of the bridge connection electrical valves.

In FIG. 3, the auxiliary power sources (31a), (31b) which are connected in parallel to the intermittent solid state switches (2a), (2b), feed the current $I_c$ through the auxiliary electrical valves (32a), (32b) during the turn-off time of the solid state switches (2a), (2b). The voltage drop caused by series voltage drop elements (33a), (33b) gives the reverse potential at the intermittent potential points SP, SN.

Accordingly, they impart the function being equivalent to the auxiliary voltage sources (35a, 35b) and the auxiliary switches (34a, 34b) in FIG. 2(b). The auxiliary switches (34a) (34b) can be a common auxiliary switch (34) as FIG. 2(c). The common auxiliary switch (34) can feed the current or the passive auxiliary switch (32) can feed the current by turning off one of the intermittent switches (2a), (2b).

Various control methods (operations) can be considered for the embodiment of FIG. 3. The operation time charts are shown in FIGS. 4(a) to (d).

Figure 4:
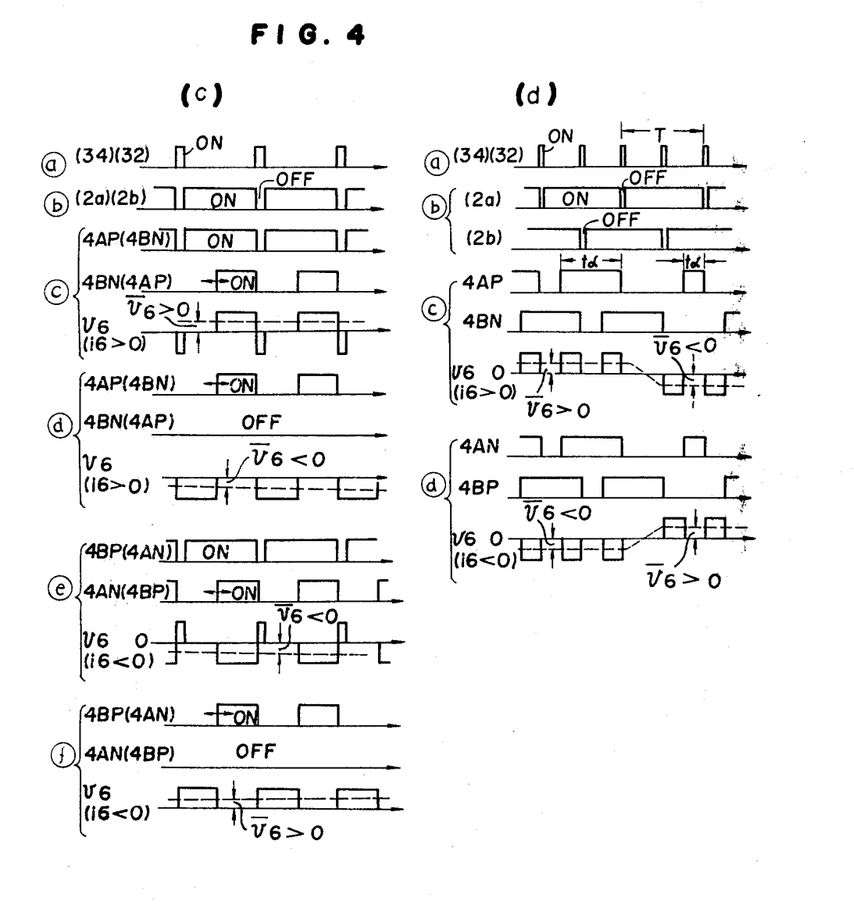
FIGS. 4(a) to (d) are operation time charts showing the operation controlling method of the invention (operation time chart)
Figure 4A:
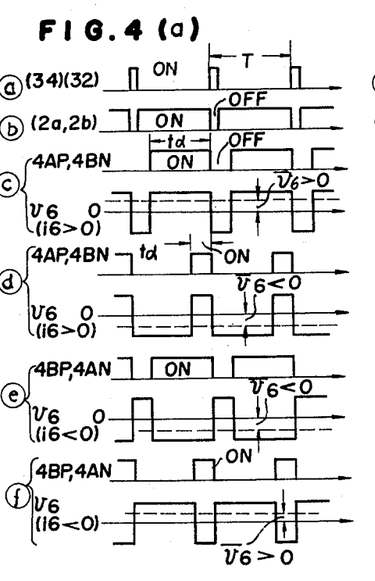

FIG. 4(a) shows the time chart in a simple DC control. FIG. 4(a) ⓐ, ⓑ are the time chart of the auxiliary intermittent switch (34) (or passive auxiliary switch (32)) and the time chart of the intermittent switches (2a, 2b) and they are simultaneously turned on and off.

When the conductive control of the control electrical valves $4_{AP}$, $4_{BP}$ are carried out for the positive load current ($i_6 > 0$) as shown in FIG. 4 ⓒ, in the embodiment of FIG. 3, the voltage $v_6$ of the load (6) is given as shown in FIG. 4. That is, the positive voltage is applied through (1)—(2a)—($4_{AP}$)—(6)—($4_{BN}$)—(2b) to feed it during the time feeding to the control electrical valves ($4_{AP}$, $4_{BN}$) and the negative voltage is applied through ($5_{AN}$)-(6)-($5_{BP}$)-(1) to regenerate it during the turn-on delay time (non-feeding time) of the control electrical valves ($4_{AP}$), ($4_{BN}$).

When the ratio of turn-on gain time tα to period T (α=tα/T) is more than ½ (α>½). The means value $\bar{v}_6$ of the load voltage is positive ($\bar{v}_6>0$) to feed in time average. On the other hand, when α<½ as shown in FIG. 4 ⓓ it is regenerated in time average as $\bar{v}_6<0$.

When the load current $i_6$ is negative ($i_6<0$), the turn-on time of the control electrical valves $4_{BP}$, $4_{AN}$ are controlled.

The feed condition (α>½, $\bar{v}_6<0$) in the reverse load current ($i_6<0$) is shown in FIG. 4(a) ⓔ and the regenerative condition (α<½, $\bar{v}_6>0$) is shown in FIG. 4(a) ⓕ.

Figure 4B:
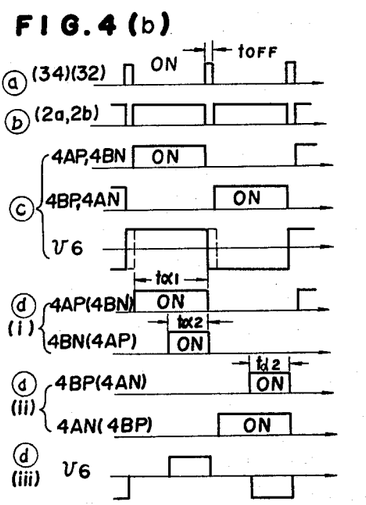

FIGS. 4(b) are the operation time charts in the simplest AC generation wherein the maximum feeding time control is shown in ⓒ and the pulse width control is shown in ⓓ. In FIG. 4(b) ⓒ, the control electrical valves ($4_{AP}$, $4_{BP}$) are simultaneously turned on; ($4_{BP}$, $4_{AN}$) are simultaneously turned on and ($4_{BP}$, $4_{AN}$) and ($4_{AP}$, $4_{BN}$) are alternatively turned on. The load voltage $v_6$ has the waveform shown by the full line to the delay power-factor load and has the waveform shown by the dotted line to the gain power-factor. The difference is caused by the difference of polarity of the load current $i_6$ during the turn-off time $t_{off}$ of the intermittent switch (2).

When the AC output voltage $v_6$ is controlled by the pulse width control, the turn-on point tα2 of one of ($4_{AP}$, $4_{BN}$) is delayed as shown in FIG. 4(b) ⓓ (i) and the turn-on point of one of ($4_{BP}$, $4_{AN}$) is delayed as shown in 4(b) ⓓ (ii) whereby the waveform $v_6$ of FIG. 4(b) ⓓ (iii) is given in the resistant load.

FIG. 4(c) is the operation time chart of the unsymmetrical control method. In FIG. 3, one of the control electrical valves ($4_{AP}$), ($4_{BN}$) is in ON state during all sections and the turn-on point of the other of ($4_{AP}$), ($4_{BN}$) is delayed in the feeding mode of the load current $i_6>0$ and the load voltage $\bar{v}_6>0$. The mode is shown in FIG. 4(c) ⓒ.

One of the control electrical valves ($4_{BN}$), ($4_{AP}$) is in OFF state during all sections and the turn-on point of the other of ($4_{BN}$), ($4_{AP}$) is controlled in the regenerative mode of $i_6>0$ and $\bar{v}_6>0$. The mode is shown in FIG. 4(c) ⓓ.

One of the control electrical valves ($4_{BP}$), ($4_{AN}$) is in ON state during all sections and the turn-on point of the other is controlled in the reverse current feeding mode of $i_6>0$ and $\bar{v}_6<0$. The mode is shown in FIG. 4(c) ⓔ.

One of the control electrical valves ($4_{AN}$), ($4_{BP}$) is OFF state during all sections and the turn-on point of the other is controlled in the reverse current regenerating mode of $i_6<0$ and $\bar{v}_6>0$. The mode is shown in FIG. 4(c) ⓕ.

In the unsymmetrical control method of FIG. 4(c), the load terminal short-circuit time (section of $v_6=0$) is given to decrease the load current ripple in comparison with the mode of FIG. 4(a).

FIG. 4(d) is the operation time chart of the control method for two phase intermittent of the intermittent switches (2a), (2b) (to turn-off under shifting ½ period each other). The intermittent switches (2a), (2b) are turned on and off as shown in FIG. 4(d) ⓑ.

On the other hand, the turn-on points of ($4_{AP}$), ($4_{BN}$) are controlled to the turn-off points of (2a), (2b) in the load current $i_6>0$ as shown in FIG. 4(d) ⓒ, wherein the feeding mode of the load voltage $\bar{v}_6>0$ is given at the ratio of $\alpha=t\alpha/T>\frac{1}{2}$ and the regenerative mode of the load voltage $\bar{v}_6<0$ is given at the ratio of $\alpha=t\alpha/t<\frac{1}{2}$.

The turn-on points of both of ($4_{AN}$), ($4_{BP}$) are respectively controlled in the mode of load current $i_6<0$ as shown in FIG. 4(d) ⓓ wherein the feeding mode of $\bar{v}_6<0$ is given at the ratio of $\alpha=t\alpha/T>\frac{1}{2}$ and the regenerative mode of $\bar{v}_6>0$ is given at the ratio of $\alpha=t\alpha/T<\frac{1}{2}$. In the two phase control method, the load voltage pulsating frequency is two times of the intermittent frequency of said intermittent means. The load current ripple is the minimum because of the short-circuit mode.

As described above, these control methods are suitable for a control of DC loads, a modulation control of time ratio of AC loads, and a control of a DC motor and an AC motor. These control methods can be applied for multi-phase bridge connection.

Figure 5:
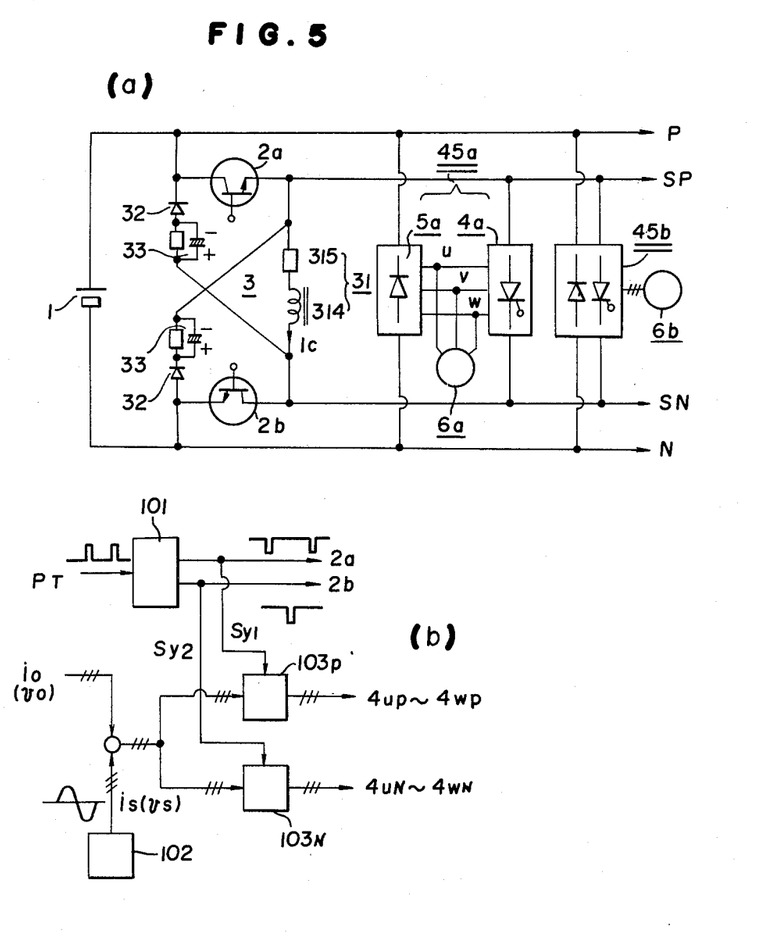
FIGS. 5 to 8 are respectively connection diagrams of the embodiments of the invention.

FIGS. 5(a), (b) show one embodiment of the invention in detail. FIG. 5(a) shows the passive auxiliary intermittent means which commonly uses positive and negative of the current source (31). A resistor (315) limits to a predetermined current $I_c$ during the time feeding current by the intermittent switches (2a), (2b). In OFF state of either of the switches, the current is fed to a passive auxiliary switch (32) by an inductance (314) whereby the reverse potential is given for the voltage drop component by a voltage drop element (33) which can be a resistor, a capacitor, an inductance or a nonlinear element.

An electrical valve device (45) comprises the control electrical valves in multi-phase bridge connection (4), and the electrical valves in multi-phase bridge connection (5). The multi-phase load (6) is connected.

FIG. 5(b) is a block diagram showing one embodiment for the control methods, which comprises a frequency divider (101) which receives clock pulse $P_T$ to output two phase synchronous signals $S_{y1}$, $S_{y2}$ for controlling the intermittent switches (2a), (2b); means for detecting each phase output current $i_0$ or each phase output voltage $v_0$ (not shown); a reference wave generator (102) for providing each phase output current reference wave $i_s$ or each phase output voltage reference wave $v_s$; a turn-on point control device ($103_p$) for controlling the turn-on points of the positive group of the electrical valves 4 up to $4_{UP}$ to $4_{WP}$ under synchronizing to synchronous signal $s_{y1}$ and a turn-on point control device ($103_N$) for controlling the turn-on points of the negative group of the electrical valves $4_{UN}$ to $4_{WN}$ under synchronizing to synchronous signal $S_{y2}$.

In FIG. 5(b), the symbol ╫ designates an elimination of the multi-phase signal lines.

The reversible DC power control can be attained by forming a single phase bridge of the electrical valve device in FIG. 5(a) and a single phase of the control device in FIG. 5(b) and providing DC reference of the reference wave.

The variable frequency control of the AC machine can be attained by using a variable frequency reference wave generator. These ones can be applied various fields.

Figure 6:
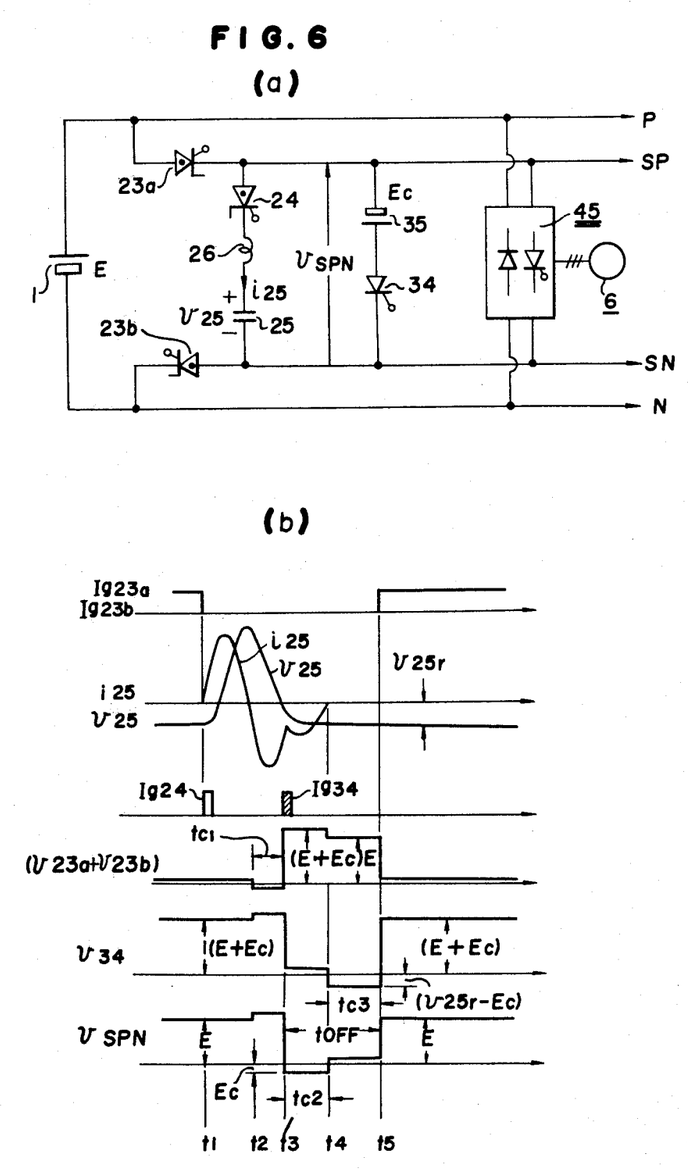

In the embodiment of FIGS. 6, a thyristor chopper is used as the intermittent means. In FIG. 6(a), reverse turn-on thyristors (23a), (23b), a commutation reverse turn-on thyristor (24), a commutation capacitor (25), a commutation reactor (26) and an auxiliary intermittent switch (34) are connected. FIG. 6(b) is the operation time chart wherein the references $I_{g23a}$, $I_{g23b}$ respectively designate gate signals of the reverse turn-on thyristors (23a), (23b) and $I_{g24}$, $I_{g34}$ respectively designate gate signals of the thyristors (24), (34).

The capacitor (25) is slightly charged through (34)—(25)—(26)—(24) in reverse polarity by turning on an initial starting thyristor.

The main thyristors (23a), (23b) are turned on to give forward potential to SP, SN. In order to turn-off them, the commutation thyristor (24) is turned on at the time point $t_1$ whereby the capacitor voltage $v_{25}$, the capacitor current $i_{25}$ are given as shown in the time chart by feeding through (1)—(23a)—(24)—(26)—(25)—(23b).

The main thyristors (23a), (23b) are turned off during the reverse negative pulse current section $t_{c1}$ of the capacitor current $i_{25}$. The auxiliary switch (34) is turned on at the time point $t_3$ when the capacitor current $i_{25}$ is negative current and the capacitor voltage $v_{25}$ is near zero voltage or slight positive polarity whereby the voltage between SP-SN is the reverse voltage $E_c$ to maintain the time $t_{c2}$ for turning off the control electrical valve (4). The capacitor voltage $v_{25}$ is charged to the reverse polarity voltage $v_{25r}$ through (35)—(34)—(2-5)—(26)—(24) in oscillation as shown in FIG. 6(b) and the auxiliary switch (34) is turn-off at the time point $t_4$. When it gives $v_{25r}>E_c$, the auxiliary switch (34) is spontaneously turn-off even though it is a thyristor.

The main thyristors (23a), (23b) are turned on at the time point $t_5$ after the turn-off time $t_{c3}$, for the auxiliary switch (34).

In the operation, the substantial turn-off time $t_{off}$ is from the turn-on of the auxiliary switch (34) to the turn-on of the main thyristor ($t_3$ to $t_5$).

When the auxiliary switch (34) having self-turn-off function such as transistor is used, it is possible to give $t_{c3}=0$ and the turn-off time $t_{off}$ can be only the time $t_{c2}$ for turning off the control electrical valves (4).

During the other time $t_1$ to $t_3$, the main thyristor (23) is ON state in either positive or negative direction, and accordingly, the time $t_1$ to $t_3$ is substantially turn-on time.

In the other embodiment for various turn-off means a thyristor chopper can be used.

Figure 7:
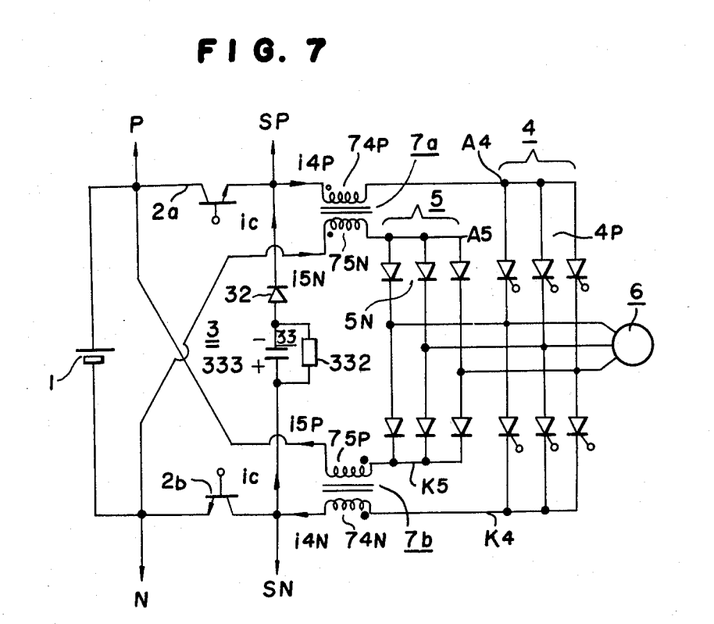

FIG. 7 shows the other embodiments of the electrical valve device in detail wherein a coupling reactor winding ($7_{4P}$) is connected between the DC input terminal $A_4$ of the control electrical valve bridge (4) and the intermittent potential point SP; a coupling reactor winding ($7_{4N}$) is connected between $K_4$ and SN and a coupling reactor winding ($7_{5P}$) is connected between the DC terminal $K_5$ of the electrical valve bridge and the fixed potential point P; a coupling reactor winding ($7_{5N}$) is connected between $A_5$ and N; and the coupling reactor windings ($7_{4P}$) and ($7_{5N}$) are in tight coupling and ($7_{4N}$) and ($7_{5P}$) are in tight coupling. The tight coupling can be attained by the bifilar winding. The reactors (7a) and (7b) can have a common iron core.

The potential difference between $A_4$–$A_5$ is the same with that having no reactor (7a) by the tight coupling, because the potential difference between SP-$A_4$ is the same with the potential difference between N-$A_5$ ($7_{4P}$ voltage is equal to $7_{5N}$ voltage) and accordingly the potential difference between $A_4$–$A_5$ is the same with the potential difference between SP-N for having no reactor. The potential difference between $K_4$–$K_5$ is the same. Accordingly, the reactors (7a), (7b) operate as the same with the embodiment of FIG. 2 on the turn-off of the electrical valves (4). For example, in the control electrical valve ($4_P$) in positive side, the load current smoothly is commutated as $i_{5N}$ to the electrical valve ($5_N$) and the reactor winding ($7_{5N}$) in negative side by turn-off the intermittent switch ($2_a$). The reverse-bias is given to ($4_P$) by certain reverse potential given by the auxiliary intermittent mean (3). The reverse-bias is given to N—($7_{5N}$)—($5_N$)—($4_P$)—($7_{4P}$)—(3)—($2_b$)—N.

When the passive auxiliary switch (32) (diode) is used, and the stored carriers in the diode are more than the stored carriers in the electrical valves (4), the turn-off of the electrical valve (4) is accelerated.

In the embodiment of FIG. 7, the total currents ($i_{4P}$+$i_{5N}$) fed into the load (6) are smoothed by the coupling reactor (7a) and the total currents ($i_{4N}$+$i_{5P}$) fed out are smoothed by the coupling reactor (7b). Accordingly, the smoothed DC current or rectangular wave AC current is fed to the loads (6) as the current source. The loads have the common potential points of SP, SN, N and P and can be driven together with the electrical valve device of the above-mentioned embodiment.

Figure 8:
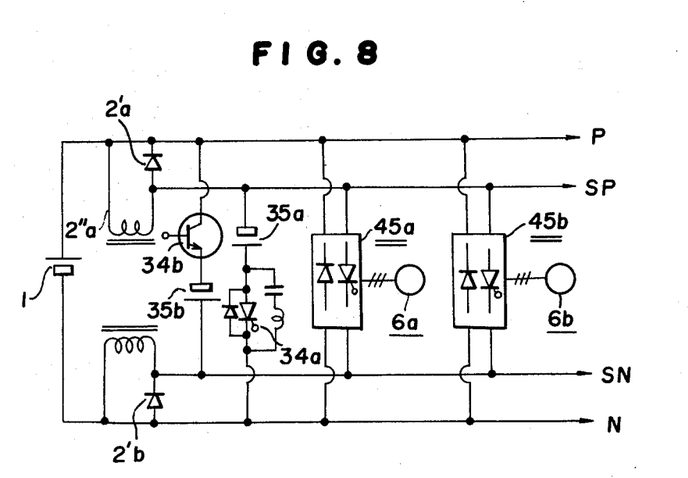

FIG. 8 shows one embodiment wherein reactors ($2''a$), ($2''b$) and diodes ($2'a$), ($2'b$) are used as the intermittent means ($2_a$), ($2_b$). In the embodiment, the potentials of the intermittent potential points SP, SN are changed to reverse potentials during a predetermined short time $t_{OFF}$. The electrical valves ($45a$) ($45b$) are the same with those of the above-mentioned embodiment. In the embodiment, the reactors ($2''$) are always connected in series to the line whereby the current limiting effect is attained to be easily protected from the short circuit in the fault of short-circuit.

Figure 9:
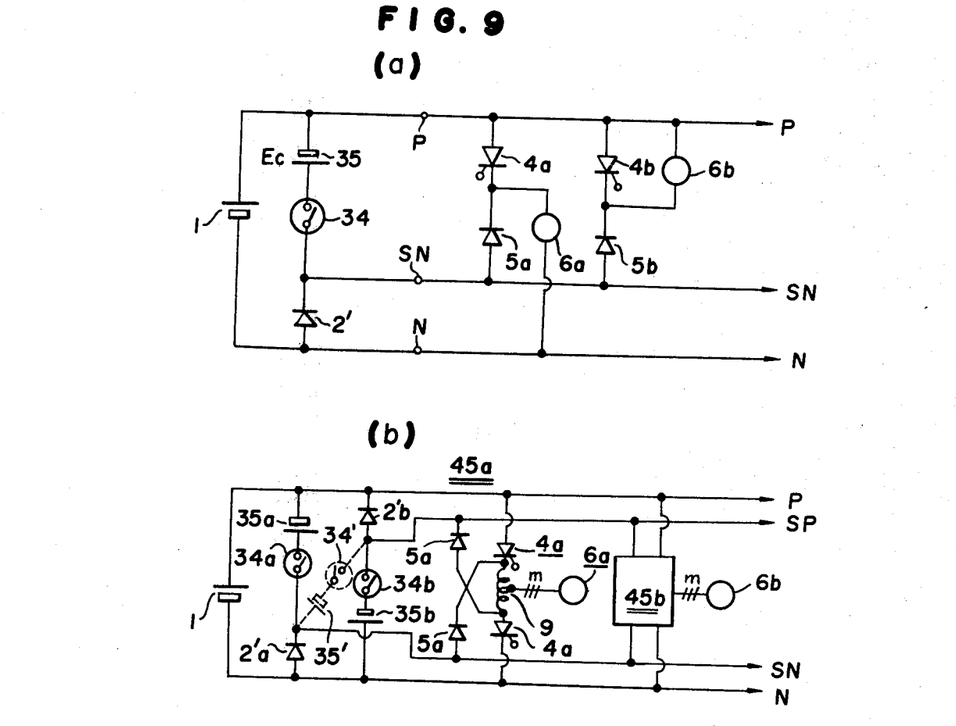

FIG. 9(a) is a connection diagram of another embodiment of the invention, wherein the control electrical valve (4) is connected to the fixed potential point P and the non-control electrical valve (5) is connected to the intermittent potential point SN. In FIG. 9(a), the auxiliary intermittent switch (34) feeds current during a predetermined short time $t_{off}$ for turning off the control electrical valve (5) whereby the potential at the intermittent potential point SN in the non-control electrical valve side is shifted to forward potential for auxiliary voltage $E_c$ from the fixed potential point P in the control electrical valve side, and the control electrical valve is turned off.

The controls electrical valve (4) control the time for feeding the load current under controlling the turn-on delay time after the turn-off.

During the turn-on delay time of the control electrical valve (4), the current is fed through the passive intermittent switch (2') (electrical valve) and the non-control electrical valve (5).

FIG. 9(b) shows the embodiment for modifying the embodiment of FIG. 9(a) so as to apply for the control of the reverse DC loads or the AC loads. In FIG. 9(b), the reference (45) designates an electrical valve device comprising a m phase control electrical valve bridge (4) and m phase non-control electrical valves (5).

FIG. 10(a) shows another embodiment of the invention wherein the main intermittent switch (2) comprises reverse parallel non-control electrical valves (2') and both of the reversible DC loads and the AC loads can be controlled by one series intermittent switch (2) by increasing pulse current endurance of the auxiliary intermittent switch (34) and the auxiliary power source (35).

In FIG. 10(a), the non-control electrical valves (5) are connected in reversely parallel to the control electrical valves (4) and a pulse impedance element (9) (e.g. reactor) is connected in series to the DC common line of the reverse parallel bridge. The pulse impedance element (9) has inductance l and line resistance r, and it can be a wiring impedance in desired arrangement in design.

FIG. 10(b) is the time chart of the embodiment. The auxiliary intermittent switch (34) feeds the current during a predetermined short time $t_{OFF}$ in OFF state of the intermittent switch (2), whereby the auxiliary power voltage $E_c$ is applied between SP-N in reverse direction as the voltage $V_{SP-N}$. The reverse pulse currents $i_{Ra}$, $i_{Rb}$ are fed to the electrical valve bridges (45) by the reverse voltage and the pulse impedance (9). Total currents $i_{34} = \Sigma i_R$ are fed to the auxiliary solid switch (34) and the auxiliary power source (35). The control electrical valve (5) of the electrical valve bridges (45) is turned off by the reverse voltage pulse $E_c$ and the reverse current pulse $i_R$..During the period T of the turn-of time $t_{OFF}$, the turn-on point of the electrical valve (5) is controlled whereby a plurality of loads can be controlled as the same with the above-mentioned embodiment.

Figure 10:
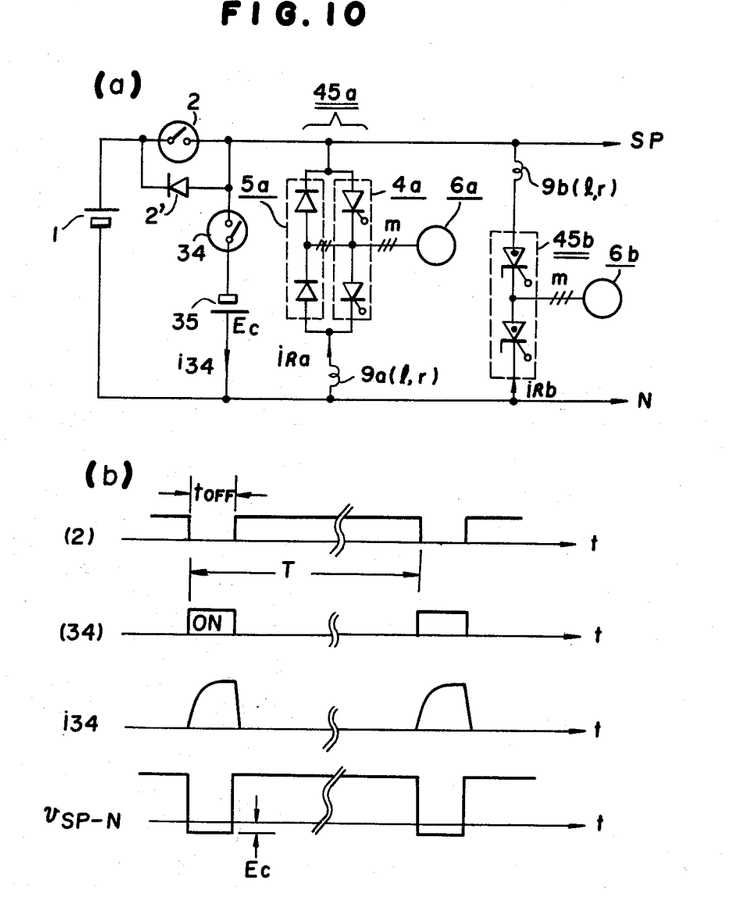

In the embodiment of FIG. 10, the main intermittent switch (2) can be replaced to the current limit reactor ($2''$).

In the above-mentioned embodiments, one of the input terminals potentials of the electrical valves is the fixed potential to the DC power source. As indicated in the embodiment of FIG. 10, the relative intermittent potential relation is given. Accordingly, it is possible that one is defined as the reference fixed potential whereas the other is intermittent potential. The electrical valve (5) is connected to the other intermittent potential terminal so as to perform the control function by the turn-on point control. In this case, the electrical valve can be the control electrical valve.

In accordance with the present invention, the intermittent means (2) or (3) which has self-turn-off function can be a simple chopper etc. and the electrical valve device (45) corresponding to loads which should be independently controlled, need not to have self-turn-off function nor forcible turn-off means. Accordingly, the electrical valve device is economical and the total power control system is remarkably economical.

Moreover, the reverse voltage is applied from the auxiliary power source through the auxiliary solid switch to the electrical valves whereby the reverse-bias voltage can be enough high and the reverse-bias time can be enough long. The reverse-bias can be precisely applied.

What is claimed is:

1. A power control system comprising:
   intermitting means for applying an intermittent positive potential difference between an intermittent potential point and a fixed potential point;
   a plurality of pairs of oppositely-poled series-connected valves, each pair comprising a controllable electrical valve and another electrical valve having anodes and commonly connected cathodes, each pair of valves being connected in parallel between said intermittent potential point and said fixed potential point, the anode of said controllable valve connected to said intermittent potential point, and the anode of said other valve connected to said fixed potential point;
   a plurality of bidirectional current loads which are respectively connected between the series junctions of each pair of valves and said fixed potential point and which are independently driven; and
   a reverse potential intermittent auxiliary means connected between said intermittent potential point and said fixed potential point and comprising an auxiliary power source having a positive potential terminal connected to said fixed potential point and an auxiliary solid state switch connected in series between said auxiliary power source and said intermittent potential point.

2. A power control system according to claim 1, wherein: said loads are motors.

3. A power control system according to claim 1, wherein: said intermitting means comprises a transistor.

4. A power control system according to claim 1, wherein: said intermitting means comprises a gate turn-off thyristor.

5. A power control system according to claim 1, wherein: said intermitting means comprises a thyristor type chopper.

6. A power contorl system according to claim 1, wherein:
   said intermitting means comprises a reverse conducting thyristor.

7. A power control apparatus comprising:
   a DC power source having a positive and negative terminal;
   an intermittent potential terminal;
   potential intermitting means connected between said intermittent potential terminal and one of the terminals of said DC power source for intermittently changing the potential of said intermittent potential point;
   auxiliary potential reversing means including an auxiliary DC power source in series with an auxiliary solid state switch, said auxiliary potential reversing means being connected between said intermittent potential terminal and the other of the terminals of said DC power source so that the sense of said auxiliary DC power source is the same as the sense of said DC power source;
   a plurality of reverse series connected electrical valve means, each valve means including a controllable electrical valve and a non-controllable electrical valve, one end of the controllable electrical valve being connected to the corresponding end of the non-controllable electrical valve, and each said reverse series connected electrical valve means being connected between said intermittent potential terminal and the other of the terminals of said DC power source so that said controllable electrical valves are forward-biased by said DC power source and said non-controllable electrical valves are reverse-biased by said DC power source;
   said auxiliary solid state switch having a control electrode and a pair of main electrodes and being controlled for switching to a nonconductive state from a conductive state by said control electrode, and
   said auxiliary potential reversing means functioning for providing a potential, which is of reverse polarity with respect to the potential of the one of the terminals of said DC power source, to said intermittent potential terminal during a time interval for reversely biasing said controllable electrical valves.

8. A power control apparatus according to claim 7 wherein:
   said auxiliary solid state switch is a transistor.

9. A power control apparatus according to claim 7 wherein:
   said auxiliary solid state switch is a gate turn-off thyristor.

10. A power control apparatus according to claim 7 wherein:
    the other end of said controllable electrical valve of each of said reverse series connected electrical valve means is connected to said intermittent potential terminal.

11. A power control apparatus according to claim 10 including:
    a load having reversible polarity of voltage thereof, one end of said load being connected to the junction of a controllable electrical valve and a non-controllable electrical valve and the other end of said load being connected selectively to the one or the other of the terminals of said DC power source.

12. A power control apparatus according to claim 10 including:
    a plurality of loads having reversible polarity of voltage thereof, one end of each said loads being connected to the junction of a controllable electrical valve and a non-controllable electrical valve and the other end of each said loads being connected selectively to the one or the other of the terminals of said DC power source.

13. A power control apparatus according to claim 7 including:
    individual loads having reversible polarity of voltage thereof, each said load being connected to the junction of a controllable electrical valve and a non-controllable electrical valve.

14. A power control apparatus according to claim 7 wherein: said potential intermitting means consists of a solid state switch.

15. A power control apparatus according to claim 7 wherein: said potential intermitting means consists of a transistor.

16. A power control apparatus according to claim 7 wherein: said potential intermitting means consists of a gate turn-off thyristor.

17. A power control apparatus according to claim 7 wherein:
said potential intermitting means consists of a reactor with a rectifier element connected in parallel with said reactor.

18. A power control apparatus which comprises:
a DC power source having a positive and negative terminal;
a first plurality and a second plurality of reverse series connected electrical valve means;
first and second intermittent potential terminals;
first and second potential intermitting means; and
first and second auxiliary potential reversing means;
wherein the first potential intermitting means is connected between one of the terminals of said DC power source and the first intermittent potential terminal; the second potential intermitting means is connected between the other of the terminals of said DC power source and the second intermittent potential terminal; both of the first plurality of the reverse series connected electrical valve means and the first auxiliary potential reversing means are connected between the other of the terminals of said DC power source and the first intermittent potential terminal; and both of the second plurality of the reverse series connected electrical valve means and the second auxiliary potential reversing means are connected between the one of the terminals of said DC power source and the second intermittent potential terminal.

19. A power control apparatus comprising:
a DC power source having a positive and negative terminal;
an intermittent potential terminal whose potential is intermittently changed with respect to potential of one of the terminals of said DC power source;
potential intermitting means including a diode electrical valve connected between said intermittent potential terminal and the other of the terminals of said DC power source;
auxiliary potential reversing means including an auxiliary DC power source, and an auxiliary solid state switch connected in series to said auxiliary DC power source, said auxiliary potential reversing means being connected between siad intermittent potential terminal and the one of the terminals of said DC power source in forward polarity with respect to said DC power source;
a plurality of reverse series connected electrical valve means, each valve means including a controllable electrical valve and a non-controllable electric valve, one end of the controllable electric valve being connected to one end of the non-controllable electrical valve in reverse polarity with respect to each other, and each said reverse series connected electrical valve means being connected between said intermittent potential terminal and the one of the terminals of said DC power source so that the other end of each said non-controllable electrical valve of said reverse series connected electrical valve means is connected to said intermittent potential terminal and said controllable electrical valves have forward polarity with respect to said DC power source and said non-controllable electrical valves have reverse polarity with respect to said DC power source;
said auxiliary solid state switch having a control electrode and a pair of main electrodes and being controlled for switching to a non-conductive state from a conductive state by said control electrode, and
said auxiliary potential reversing means functioning for providing a potential, which is of reverse polarity with respect to the potential of the other of the terminals of said DC power source, to said intermittent potential terminal during a time interval for reversely biasing said controllable electrical valves.

20. A power control apparatus according to claim 19 wherein:
said auxiliary solid state switch is a transistor.

21. A power control apparatus according to claim 19 wherein:
said auxiliary solid state switch is a gate turn-off thyristor.

22. A power control apparatus comprising:
a DC power source having a positive and a negative terminal;
a first plurality and a second plurality of reverse series connected electrical valve means;
first and second intermittent potential terminals;
first and second potential intermitting means; and
first and second auxiliary potential reversing means,
wherein the first potential intermitting means is connected between one of the terminals of said DC power source and the first intermittent potential terminal; the second potential intermitting means is connected between the other of the terminals of said DC power source and the second intermittent potential terminal both of the first plurality of the reverse series connected electrical valve means and the first auxiliary potential reversing means are connected between the other of the terminals of said DC power source and the first intermittent potential terminal and both of the second plurality of the reverse series connected electrical valve means and the second auxiliary potential reversing means are connected between the one of the terminals of said DC power source and the second intermittent potential terminal.

23. A power control apparatus according to claim 22 wherein:
each reverse series connected electrical valve means includes a controllable electrical valve and a non-controllable electrical valve, one end of the controllable electrical valve being connected to one end of the non-controllable electrical valve in reverse polarity with respect to each other, the other end of the controllable electrical valve of said first plurality of said reverse series connected electrical valve means being connected to the other of the terminals of said DC power source; the other end of the non-controllable electrical valve of said first plurality of said reverse series connected electrical valve means being connected to said first intermittent potential terminal; the other end of the controllable electrical valve of said second plurality of said reverse series connected electrical valve means being connected to the one of the terminals of said DC power source; the other end of the non-controllable electrical valve of said second plurality of said reverse series connected electrical valve means being connected to said second intermittent potential terminal; and including
a reactor connected between the one end of said controllable electrical valve of said first plurality of said reverse series connected electrical valve means and the one end of said controllable electrical valve of said second plurality of said reverse series connected electrical valve means; and
a load being connected to said reactor.

24. A power control system comprising:
a DC power source having positive and negative terminals;
a positive intermittent terminal;
a negative intermittent terminal;
a first intermitting rectifier element having an anode connected to said negative terminal of said DC power source and a cathode connected to said negative intermittent terminal;
a second intermitting rectifier element having a cathode connected to said positive terminal of said DC power source and an anode connected to said positive intermittent terminal;
a first controlled electrical valve having an anode connected to said positive terminal of said DC power source and a cathode;
a second controlled electrical valve having a cathode connected to said negative terminal of said DC power source;
a reactor connected between the cathode of said first controlled electrical valve and anode of said second controlled electrical valve;
a first noncontrollable electrical valve having an anode connected to the anode of said second controlled electrical valve and a cathode connected to said positive intermittent terminal; and
a second non-controllable electrical valve having a cathode connected to the cathode of said first controllable electrical valve and an anode connected to said negative intermittent terminal;
first potential reversing means for applying a reverse voltage to said first controlled electrical valve connected between the positive terminal of said DC power source and said negative intermittent terminal; and
second potential reversing means for applying a reverse voltage to said second controlled electrical valve connected between the negative terminal of said DC power source and said positive intermittent terminal;
wherein said first and the second potential reversing means include an auxiliary DC power source and an auxiliary solid state switch, respectively, and a load is connected to said reactor.

25. A system according to claim 24, wherein said solid state switch comprises main electrodes and a control electrode controllably operated to interrupt the conduction between said main electrodes.

26. A system according to claim 25, wherein said auxiliary solid state switch comprises a transistor.

27. A system according to claim 25, wherein said auxiliary solid state switch comprises gate turn-off thyristor.

28. A system according to claim 24, 25, 26 or 27, wherein the DC power source, the first and the second intermitting rectifier elements and the first and the second potential reversing means are common and plural pairs (m groups) of the first and the second controllable electrical valves, and wherein the first and the second non-controllable electrical valves and the reactor are connected.

29. A power control system comprising:
intermittent means having positive and negative input terminals, and positive and negative intermittent output terminals;
a first solid state switch connected between the positive input terminal and the positive intermittent output terminal;
a second solid state switch connected between the negative input terminal and the negative intermittent output terminal;
a plurality of first series connections of controllable electrical valves connected in forward parallel between said intermittent output terminals;
a plurality of second series connections of non-controllable electrical valves connected in reverse parallel between said DC input terminals;
each of the first junctions of said first series connections being connected to each of the second junctions of said second series connections;
a bidirectional load connected to the first junctions of said first series connections;
first potential reversing auxiliary means connected between the positive intermittent output terminal and the negative input terminal; and
second potential reversing auxiliary means connected between the negative intermittent output terminal and the positive input terminal.

30. A system according to claim 29, wherein said first series connections form a plurality of first bridge connections of which each comprises said controllable electrical valves, and said second series connections form a plurality of second bridge connections of which each comprises said non-controllable electrical valves.

31. A system according to claim 29 or claim 30, characterized in that said bidirectional load comprises an armature of a DC motor.

32. A system according to claim 29 or claim 30, wherein said bidirectional load comprises AC windings of a polyphase AC motor.

33. A power control apparatus comprising:
an intermittent potential terminal whose potential is intermittently changed depending upon a potential of a first terminal of a main DC power source and potential intermittent means which is connected in series between said intermittent potential terminal and a second terminal of said main DC power source,
wherein said potential intermittent means alternate periodically between a conductive and blocking phase;
mutual reverse series connected electrical valve means comprising reverse connection of controllable electrical valves and noncontrollable electrical valves, said reverse series connected electrical valve means connected between said intermittent potential terminal and the first terminal of said main DC power source; and
auxiliary reverse potential means comprising an auxiliary DC power source and auxiliary solid state switch connected in series to said auxiliary DC power source, said auxiliary reverse potential means providing a potential which is opposite the potential provided by said DC power source with said mutual reverse series connected electrical valve means synchronized with said potential intermittent means;

whereby said controllable electrical valves are controlled by turning on.

34. A power control apparatus according to claim 33, wherein a plurality of loads which are independently driven are connected to each series junction between each controllable electrical valve and each noncontrollable electrical valve in each of plural pairs of said reverse series connected electrical valve means.

35. A power control apparatus according to claim 33 or claim 34, wherein said loads comprise motors.

36. A power control apparatus according to claim 33, wherein said controllable electrical valves form a bridge connection and said non-controllable electrical valves form a bridge connection in said reverse series connected electrical valve means.

37. A power control apparatus according to claim 33, wherein each potential intermittent means is connected to said first and second terminals of said main DC power source to form two intermittent potential terminals.

38. A power control apparatus according to claim 37, wherein one of said auxiliary reverse potential means is connected between the first terminal of said main DC power source and the negative intermittent potential terminal, and another auxiliary reverse potential means is connected between the second terminal of said main DC power source and the positive intermittent potential terminal.

39. A power control apparatus according to claim 33 or claim 34, wherein:
   said auxiliary reverse potential means is connected between the first terminal of said main DC power source and said intermittent potential terminal;
   said potential intermittent means comprises an electrical valve connected between said intermittent potential terminal and the second terminal of said main DC power source; and
   DC loads, each having one side terminal connected to each junction between said controllable electrical valve and said non-controllable electrical valve, and an other side terminal connected to either of the terminals of said main DC power source.

* * * * *

UNITED STATES PATENT AND TRADEMARK OFFICE
CERTIFICATE OF CORRECTION

PATENT NO. : 4,251,757
DATED : February 17, 1981
INVENTOR(S) : MASAHIKO AKAMATSU It is certified that error appears in the above—identified patent and that said Letters Patent is hereby corrected as shown below:

Please delete the Foreign Application Priority Data.

Signed and Sealed this

Twenty-sixth Day of May 1981

[SEAL]

Attest:

RENE D. TEGTMEYER

Attesting Officer

Acting Commissioner of Patents and Trademarks